DEWALT & SCHRADER.
Meat Cutter.
No. 23,016.
Patented Feb. 22, 1859.
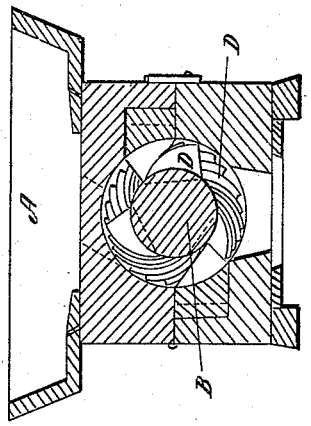
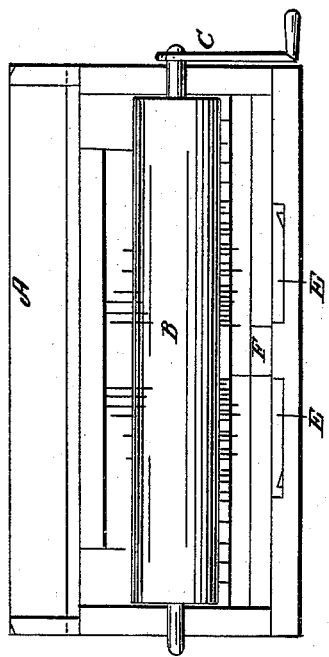
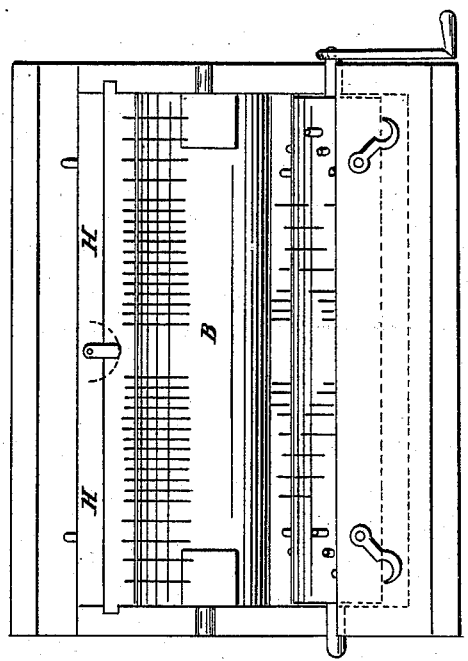
Witnesses:
Inventors:
Bent Dewalt
Charles E. Schrader

UNITED STATES PATENT OFFICE.

BENNEVILLE DEWALT AND CHARLES E. SCHRADER, OF READING, PENNSYLVANIA.

IMPROVED MEAT-CUTTER.

Specification forming part of Letters Patent No. 23,016, dated February 22, 1859.

*To all whom it may concern:*

Be it known that we, BENNEVILLE DEWALT and CHARLES E. SCHRADER, of the city of Reading, county of Berks, and State of Pennsylvania, have invented a new and useful Improvement on Machines for Mincing and Cutting Meat; and we do hereby declare that the following is a full, clear, and exact description of the construction and operation of the same, reference being had to the annexed drawings, making a part of this specification, in which—

Figure 1 is a side view of a section of the machine. Fig. 2 is an end view section. Fig. 3 is an open view of the machine.

The nature of our invention consists in the arrangement and construction of a cylinder upon which knives are placed in such a position as to facilitate the cutting or mincing of meat, giving at the same time a double action to the machine, and which can be done with less labor and expense than by any other mode now used for said purposes.

To enable others skilled in the art to make use of our invention, we will proceed to describe its construction and operation. We construct our machines as represented in Figs. 1, 2, and 3, in which—

A A represent the top; B B B, the cylinder, and D in Fig. 2 the knives fastened upon the cylinder by placing them in a screw form, and thus making the machine work from each end toward the center, where in Fig. 1, E E E, is placed a slide, through which the meat passes when cut, and by which slide we regulate the cutting of the meat. When it is desired to cut the meat fine, the opening is less than otherwise when the meat is not to be so fine.

H H in Fig. 3 represent the concave, which is arranged so that it can easily be removed for the purpose of cleaning and sharpening it.

What we claim, and desire to secure by Letters Patent, is—

The arrangement of the knives D in a screw form in different directions from the ends of the cylinder B to the center thereof to discharge the meat at the adjustable opening F in the bottom, in the manner and for the purposes described.

BENNEVILLE DEWALT.
CHARLES E. SCHRADER.

Witnesses:
I. B. WANNER,
A. B. WANNER.